United States Patent [19]

Seo et al.

[11] Patent Number: 4,653,230
[45] Date of Patent: Mar. 31, 1987

[54] VEHICLE BODY STRUCTURE

[75] Inventors: Kiyokazu Seo, Aichi; Kuniyoshi Furuhashi, Toyota; Sadaaki Natori, Toyota; Masashi Matsumoto, Toyota, all of Japan

[73] Assignee: Toyota Jidosha Kabushiki Kaisha, Japan

[21] Appl. No.: 835,730

[22] Filed: Mar. 3, 1986

[30] Foreign Application Priority Data

Mar. 13, 1985 [JP] Japan .............................. 60-35959[U]

[51] Int. Cl.[4] .......................... B60J 5/04; E05F 11/38
[52] U.S. Cl. ........................................ 49/502; 49/227; 49/349; 49/351; 49/374; 49/441
[58] Field of Search ................. 49/502, 348, 351, 374, 49/227, 375, 376, 349, 350, 352, 441

[56] References Cited

U.S. PATENT DOCUMENTS

| 3,724,133 | 4/1973 | Shirai et al. | 49/349 |
| 4,357,781 | 11/1982 | Ohya et al. | 49/374 X |
| 4,490,942 | 1/1985 | Arnheim et al. | 49/374 |

FOREIGN PATENT DOCUMENTS 56143477 3/1955 Japan .
59-145419 9/1984 Japan .

*Primary Examiner*—Philip C. Kannan
*Attorney, Agent, or Firm*—Parkhurst & Oliff

[57] ABSTRACT

A structure for a vehicle door provides a substantially flush exterior surface for the door. The structure includes a frame member, a door body, a first window, a window regulator, a slider, a fixing member and a second window. The frame member has a top portion, a bottom end portion and a first groove. The door body is connected to the bottom portion of the frame and the frame member is located at an intermediate portion of the door body. The window has a first portion which is located at an outer side of the door body within the door body. The window regulator is mounted within the door body for upwardly and downwardly displacing the window. The slider has a first and a second sides. The first side of the slider is secured to the window and the second side is slidably mounted within the first groove of the frame member. The first side of the slider is positioned outside of the second side, such that the window can be upwardly and downwardly displaced along the first groove of the frame member between an uppermost and lowermost positions. The fixing member has a second groove therein which opens in a direction opposite to the direction of opening of the first groove of the frame. The fixing member is located at the outside of the frame in a lateral direction of the door body and the fixing member is secured to lateral direction of the door body and the fixing member is secured to the frame member. The second window is secured to the fixing member. The first and second window are aligned in a longitudinal direction of the vehicle door.

20 Claims, 10 Drawing Figures

PRIOR ART

PRIOR ART

VEHICLE BODY STRUCTURE

TECHNICAL FIELD

The present invention relates to a vehicle body structure which has a substantially flush exterior surface. More particularly, the present invention relates to improvements in means for fixing a window glass to the vehicle body which do not appear on the exterior surface of the vehicle body, so that the part of the fixing means which does appear on the exterior surface of the vehicle body is small. As a result, the vehicle exterior does not have the large exterior surface of the fixing means. This improves the aesthetic appearance of the vehicle body and reduces the air resistance on the vehicle during driving.

BACKGROUND OF THE INVENTION

A conventional vehicle body structure is disclosed in Japanese Utility Model publication (i.e., Japanese Laid Open Utility Model Application Showa 56-143477 and Japanese Utility Model Application No. 55-42886). As shown in FIGS. 7 and 8, this publication discloses a vehicle body structure which has a rear portion 121 of a door window glass 12 fixed to a slider 40. The slider 4 extends rearwardly from the rear portion 121 of the door window 12 to a guide rail 108 of a door. The guide rail 108 is formed between a rear frame member 102 and a garnish 104 of the door. The slider 40 is guided by the guide rail 108, so that the door window 12 can be moved selectively upward and downward. An outer surface of the door window 12 is positioned at an outer side of a vehicle, so that the outer surface of the door window 12 is almost flush with the outer surface 106 of the door frame 100. However, this conventional vehicle structure limits the view of a passenger of the vehicle through the door window and detracts from the aesthetic appearance of the exterior surface of the vehicle body because the garnish 104 has a rather large external surface.

Another conventional vehicle body structure is disclosed in another Japanese Utility Model publication (i.e., Japanese Laid Open Utility Model application Showa 59-145419 and Japanese Utility Model application No. 58-39950). As shown in FIGS. 9 and 10, this publication discloses a door structure which has a top frame member 204, a front frame member 202, a rear frame member 208 and an intermediate frame member 206. The top, front, rear and intermediate frame members 204, 202, 208 and 206 have grooves therein.

A first space is defined between the top, front, and intermediate frame members 204, 202 and 206 and a door body 20, and a second space is defined between the top, intermediate and rear frame members 204, 206 and 208 and the door body 20. Further, a first door window 22 is movably mounted within a guide means 21 mounted in the grooves of the front and intermediate frame members 202 and 206 and a second door window 23 is fixed within the second space. As shown in FIG. 10, the second door window 23 is substantially flush with the first door window 22 and the second door window 23 is positioned rearwardly in longitudinally direction of the vehicle from the first door window 22.

Furthermore, a front portion of a slider 40 is fixed to the rear edge of the first window 22 and a rear portion of the slider 40 is inserted in the guide means 21 which is mounted in a front groove of the intermediate frame member 206. A front edge of the second door window 23 is inserted in a rear groove of the intermediate frame member 206 and the front edge of the second door window is fixed to the intermediate frame member 206 by a seal member 207.

As a result, a large exterior surface of the intermediate frame member 206 appears on the exterior surface of the vehicle body and a distance indicated by "A" in FIG. 10 becomes rather long in the longitudinal direction of the vehicle. Therefore, this conventional body structure also limits the view of a passenger of the vehicle through the door window and detracts from the aesthetic appearance of the exterior surface of the vehicle body.

SUMMARY OF THE INVENTION

The present invention was developed in view of the foregoing background and to overcome the foregoing drawbacks. It is accordingly an object of this invention to provide a vehicle body structure which does not detract from the aesthetic appearance of the exterior surface of a vehicle body, and which provides a substantially flush exterior surface of the vehicle body which reduces the resistance during vehicle driving.

To provide a substantially flush exterior surface with an improved aesthetic appearance, a vehicle body structure for a vehicle door is provided which includes a frame member, a door body, a first window, a window regulator means, a slider means, a fixing means and a second window. The frame member has a top end portion, a bottom end portion and a first groove. The door body is connected with the bottom end portion of the frame member and the frame member is located at an intermediate portion of the door body. The first window has a first portion, the first window is located at the outer side in the lateral direction of the vehicle door within the vehicle door. The window regulator means is mounted within the door body for upwardly and downwardly displacing the first window. The slider means has a first end and a second end. The first end of the slider means is secured to the first portion of the first window. The second end of the slider means is slidably mounted within the first groove of the frame member. The first end of the slider means is positioned at the outer side of the second end of the slider means in the lateral direction of the vehicle door, such that the first window can be upwardly and downwardly displaced along the first groove of the frame member between an uppermost and a lowermost position. The fixing member has a second groove therein, the second groove opens in the opposite direction of the first groove of the frame member. The fixing means is located at the outer side of the frame member in the lateral direction of the vehicle door and the fixing means is secured to the frame member. The second window has a first portion which is secured to the fixing means. The second window is aligned with the first window in a longitudinal direction of the vehicle door.

Accordingly, the fixing means is located at the outer side of the frame member in the lateral direction of the vehicle, so that compared with the conventional frame member, the exterior surface of the fixing means becomes small.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
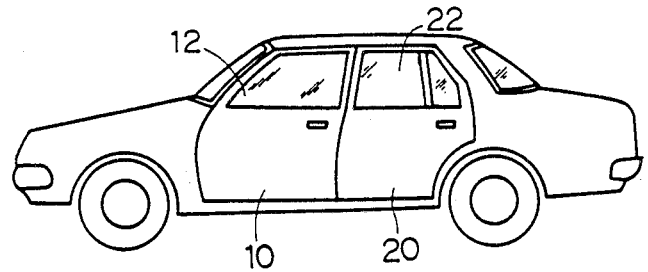
FIG. 1 is a side view of a vehicle employing a vehicle body structure according to the present invention.
Figure 2:
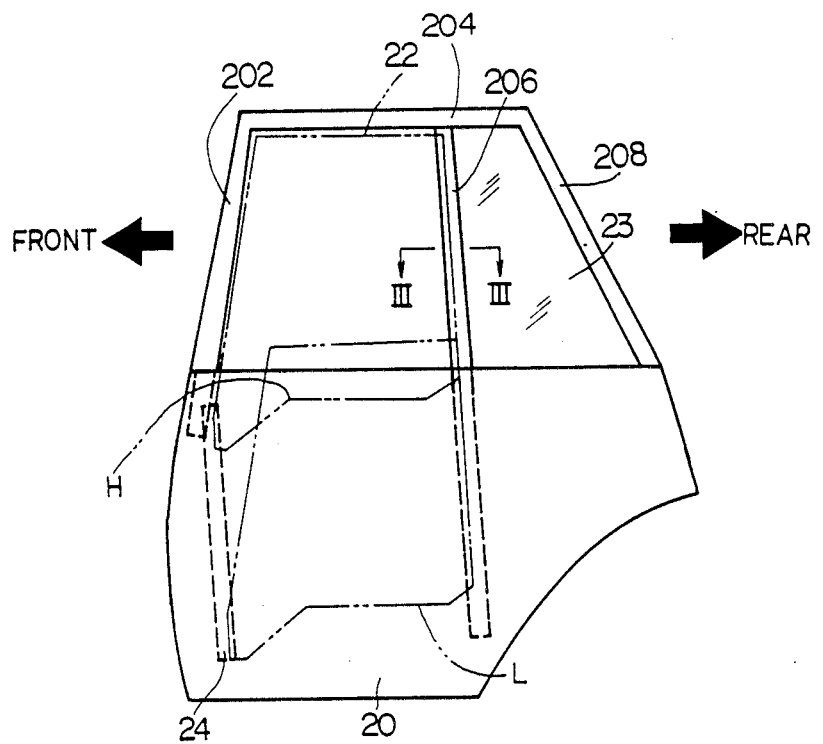
FIG. 2 is an enlarged view of a vehicle door shown in FIG. 1.

Referring to FIGS. 1 and 2, a body structure includes a front door 10 and a rear door 20. Front and rear window glass 12 and 22 are mounted within the front and rear doors 10 and 20, respectively. An enlarged detailed view of the rear door 20 is illustrated in FIG. 2. The vehicle body structure according to a first embodiment of the present invention, which is employed in the rear door 20, is illustrated in detail in FIG. 3.

The rear door 20 includes a front frame member 202, a top frame member 204, an intermediate frame member 206 and a rear frame member 208. The rear window glass 22 is mounted in the rear door 20 such that it can be displaced upwardly and downwardly by the actuation of a window regulator 30, disclosed in detail in FIG. 4. A fixed window glass 23 is mounted and fixed between the intermediate frame member 206, the top frame member 204 and the rear frame member 208.

Figure 3:
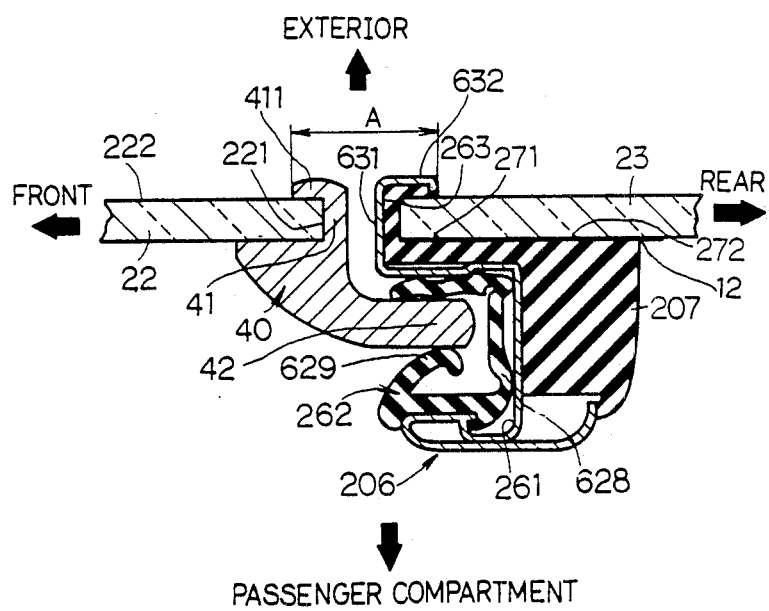
FIG. 3 is an enlarged cross-sectional view of a first embodiment of the invention, taken along the line III—III of FIG. 2.

The intermediate frame member 206 extends downwardly, adjacent to the lower portion of the rear door 20. The intermediate frame member 206 has a forward groove 261 as shown in FIG. 3. A cushion member 262, consisting of a resilient material such as a rubber, is fitted into the forward groove 261. The cushion member 262 includes a base portion 628 and a lip portion 629. The base portion 628 is in contact with the forward groove 261 of the intermediate frame member 206 and has an approximate C shape. One end of the lip portion 629 of the cushion member 262 is connected to an interior end of the base portion 628 of the cushion member 262 and an another end of the lip portion 629 is inserted into an inner portion of the C shaped base portion 628.

A first end of side 41 of a slider 40 is secured with an adhesive material to a rear edge 221 of the rear window glass 22. A second end or side 42 of the slider 40 is inserted in the inner portion of the cushion member 262 and the second side 42 of the slider 40 is in contact with an exterior end of the base portion 628 and the other end of the lip portion 629 of the cushion member 262. Accordingly, the second side 42 of the slider 40 fits into the cushion member 262 and the cushion member 262 functions as a guide means for the rear window glass 22. The slider 40 has a substantially L shape and a bent portion of the slider 40 is located in an interior of a vehicle (i.e., a passenger compartment of a vehicle). The second side 42 of the slider 40 extends in substantially parallel manner to an exterior surface 222 of the rear window glass 22. The first side 41 of slider 40 is located outside (i.e., further from the inside of the vehicle in a longitudinal direction of the vehicle) of the second side 42 of slider 40. Hence, the other end of the rear window glass 22 is guided by the slider 40, which moves upwardly and downwardly within the forward groove 261 of the intermediate frame member 206.

The intermediate frame member 206 includes a backward groove 263 which is located at an exterior side of the forward groove 261 in lateral direction of the vehicle. Accordingly, the cross-sectional shape of the intermediate frame member 206 has a substantially S shape which includes the backward groove 263 at the exterior side and the forward groove 261 at an interior side. A front surface 631 of an exterior portion of the intermediate frame member 206, which forms the backward groove 263, faces to the first side 41 of the slider 40 and a seal member 207 is mounted in the backward groove 263. The front surface 631 of the intermediate frame member 206 is positioned in the vicinity of the first side 41 of the slider 40 when the rear window glass 22 is closed. The seal member 207, consisting of a resilient material such as a rubber, includes a recess 271 and an outer surface 272. A front portion of an interior surface of the fixed window glass 23 is coated by ceramic material.

Therefore, a front edge of the fixed window glass 23 is inserted in the recess 271 and an interior surface of the fixed window glass 23 is in contact with the outer surface 272 of the seal member 207.

The rear window glass 22 is fixed to the first side 41 of the slider 40, the fixed window glass 23 is fixed in the backward groove 263, and the rear window glass 22 is aligned with the fixed window glass 23 in a longitudinal direction of the vehicle. An exterior end 632 of the intermediate frame member 206 may be made small because the exterior end 632 only functions to fix the fixed window glass 23 to the intermediate frame member 206, and in similar manner, an exterior portion 411 of the first side 41 of the slider 40 may be made small. The exterior end 632 of the intermediate frame member 206 is substantially aligned, in the longitudinal direction of the vehicle, with the exterior portion 411 of the slider 40. The exterior portion 411 of the slider 40 is smaller than an interior portion of the first side 41 of the slider 40. Accordingly, a longitudinal distance indicated by "A" in FIG. 3 becomes short, so that the exterior end 632 of the intermediate frame member 206 and the exterior portion 411 of the slider 40 do not detract from the aesthetic appearance of the exterior surface of the vehicle body and a substantially flush exterior surface of the vehicle is provided.

A front edge of the rear window glass 22 is in similar manner guided by guiding means 24 of the front frame member 202. The guiding means 24 is mounted completely within the rear door body 20, and extends in a substantially parallel relationship with the intermediate frame member 206. A top of the guiding means 24 is adjacent to the bottom of the front frame member 202. Hence, the guiding means 24 does not narrow or impair the field of vision.

The front frame member 202 and the top frame 204 have a weatherstrip (not shown in drawings) made of rubber. When the rear window glass 22 is upwardly displaced, the front edge of the rear window glass 22 is brought into contacting engagement with the weatherstrip of the front frame member 202. Further, when the rear window glass 22 is displaced so that it fills the opening defined between the front, top and intermediate frame members 202, 204 and 206, a top portion of the rear window glass 22 is brought into contacting engagement with the weatherstrip of the top frame member 204.

Figure 4:
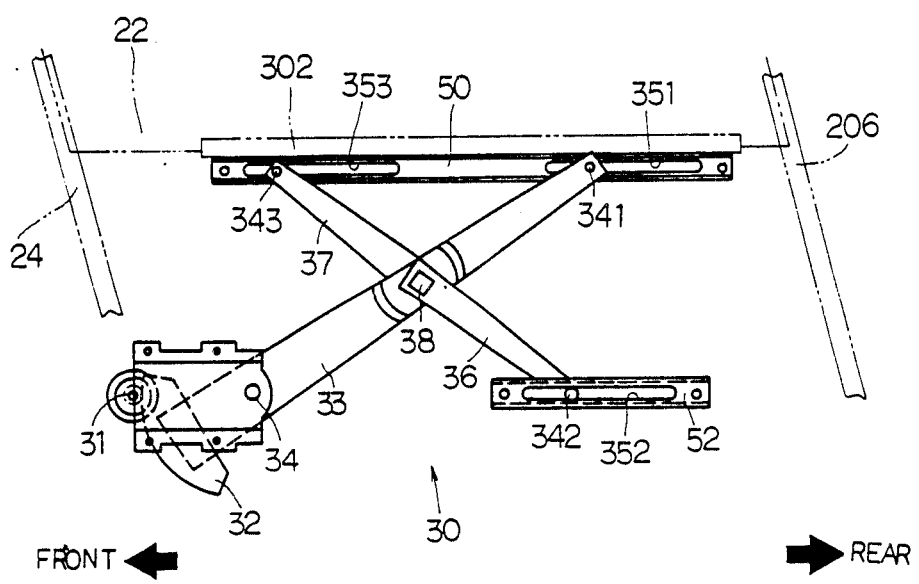
FIG. 4 is an enlarged side view of a window regulator for moving a first window glass upward and downward.

A lower portion of the rear window glass 22 is secured within a channel 302 of the window regulator 30. The structure of the window regulator 30 is shown in FIG. 4. When an operator rotates a window regulator handle (not shown in drawings), a pinion 31 rotates. The rotation of the pinion 31 is transferred to a gear 32, which is in constant meshing engagement with the pinion 31. A main arm 33 is secured to the gear 32 in a manner which permits the main arm 33 to be rotated to around a pin 34. The main arm 33 has a roller 341 at an upper end thereof. The roller 341 is inserted into a horizontal slot 351 defined within a bracket 50. The bracket 50 supports the rear window glass 22 through the channel 302. Auxiliary arms 36 and 37 are mounted on the main arm 33 in a manner which permits the auxiliary arms 36 and 37 to be rotated around a pin 38 which is secured to the main arm 33. The auxiliary arms 36 and 37 have rollers 342 and 343, respectively, at ends thereof. The roller 342 of the auxiliary arm 36 is inserted into a horizontal slot 352, which is defined within a bracket 52. The bracket 52 is secured to the rear door 20. The roller 343 of the auxiliary arm 37 is inserted into a horizontal slot 353 which is defined within the bracket 50.

When an operator rotates the window regulator handle, the pinion 31 rotates. The rotation of the pinion 31 causes the gear 32 to rotate. The main arm 33 is secured to the gear 32 resulting in the main arm 33 being rotated by the rotation of the gear 32. The rotation of the main arm 33 results in the roller 341 sliding within the slot 351 and the roller 342 and 343 sliding within the slots 352 and 353, respectively. Thus, the rear window glass 22 is upwardly and downwardly displaced by the operation of the window regulator 30.

In operation, when an operator rotates the window regulator handle and displaces the rear window glass 22 from the position L indicated by a phantom line shown in FIG. 2, the front edge and the rear edge 221 of the rear window glass 22, are guided by the guide means 24 and the forward groove 261 in the intermediate frame member 206, respectively. Thus, the rear window glass 22 is displaced upwardly and achieves a fully closed position H, as shown in FIG. 2.

Figure 5:
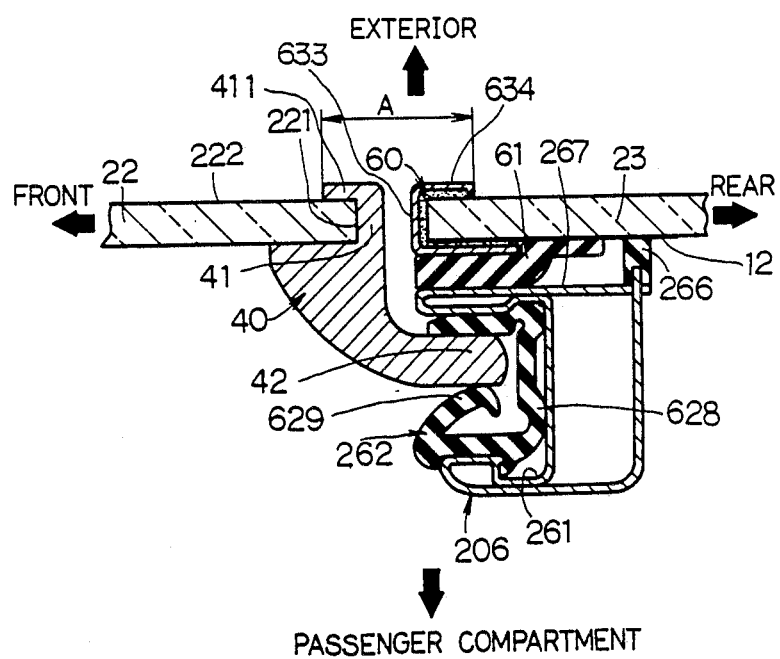
FIG. 5 is an enlarged cross-sectional view of a second embodiment of the invention, taken along the line III—III of FIG. 2.

FIG. 5 shows a second embodiment of a vehicle body structure. This second embodiment is similar to the first embodiment shown in FIG. 3. An intermediate frame member 206 includes a forward groove 261, an outer surface 267 and a backward support 266. A cushion member 262 is mounted in the forward groove 261 and a slider 40 is guided by the cushion member 262. A first side 41 of the slider 40 is fixed to a rear edge 221 of a rear window glass 22.

A fixed window glass 23 is aligned with the rear window glass 22 in longitudinal direction of a vehicle and is located at an exterior side of the intermediate frame member 206. The fixed window glass 23 is supported by the backward support 266 and the spacer 61, and the fixed window glass 23 is fixed to the outer surface 267 of the intermediate frame member 206 by a window molding 60 and the spacer 61. The window molding 60 is secured to the fixed window glass 23 by an elastic adhesive and in similar manner the spacer 61 is secured to the fixed window glass 23 and the outer surface 267 of the intermediate frame member 206. The window molding 60 has a decorative exterior portion 634 and a front surface 633 of the window molding 60 faces to the first 41 of the slider 40. The front surface 633 of the window molding 60 is positioned in the vicinity of the first side 41 of the slider 40 when the rear window glass 22 is closed. The exterior end 411 of the slider 40 is substantially aligned with the exterior portion 634 of the window molding 60 in the longitudinal direction of the vehicle. The exterior portion 634 of the window molding 60 is smaller than an interior portion of the window molding 60.

Furthermore, the rear window glass 22 is fixed to the first side 41 of the slider 40 and the fixed window glass 23 is fixed by the window molding 60. The exterior end 634 of the window molding 60 may be made small because the exterior end 634 only functions to fix the fixed window glass 23 to the intermediate frame member 206 through the spacer 61, and in a similar manner an exterior portion 411 of the first side 41 of the slider 40 may be made small.

Accordingly, in the second embodiment, a longitudinal distance indicated by "A" in FIG. 5 is short, so that the exterior end 634 of the window molding 60 and the exterior portion 411 of the slider 40 do not detract from the aesthetic appearance of the exterior surface of the vehicle body and a substantially flush exterior surface of the vehicle is provided.

Further, the fixed window glass 23 is secured to the intermediate frame member 206 by a decorative window molding 60, so that an exterior surface of the vehicle also has an improved decorative aesthetic appearance.

Figure 6:
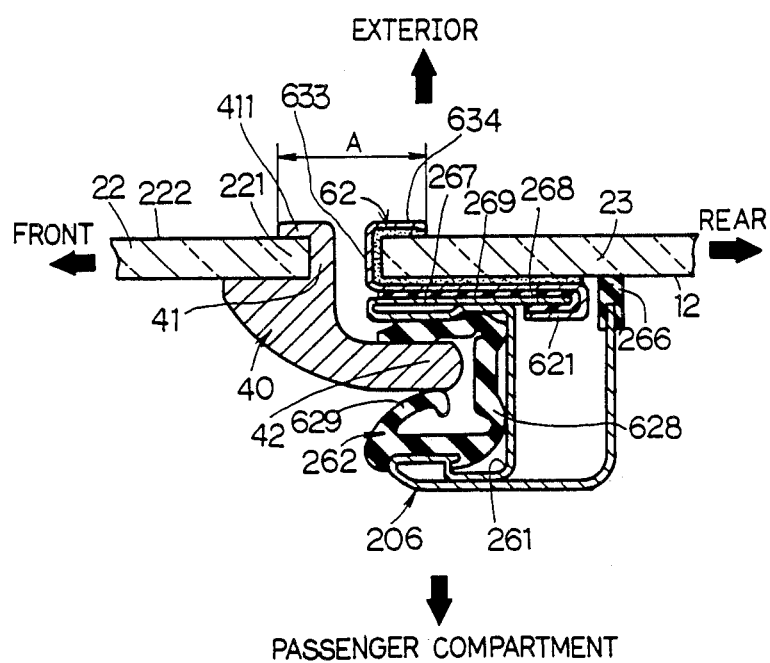
FIG. 6 is an enlarged cross-sectional view of a third embodiment of the invention, taken along the line III—III of FIG. 2.
Figure 7:
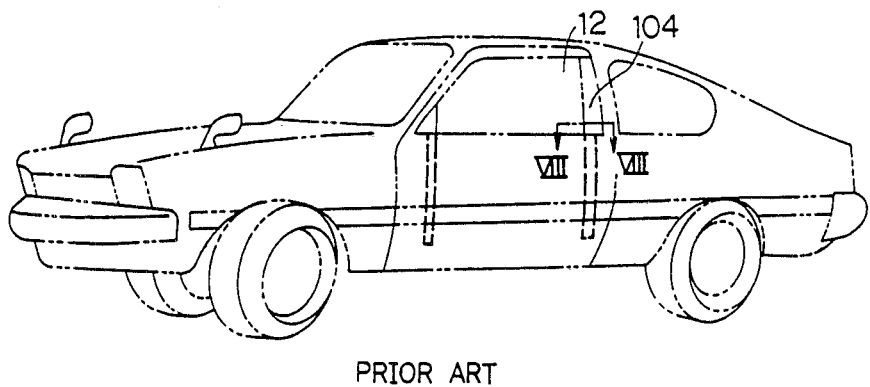
FIG. 7 is a side view of a conventional vehicle employing a conventional vehicle body structure.
Figure 8:
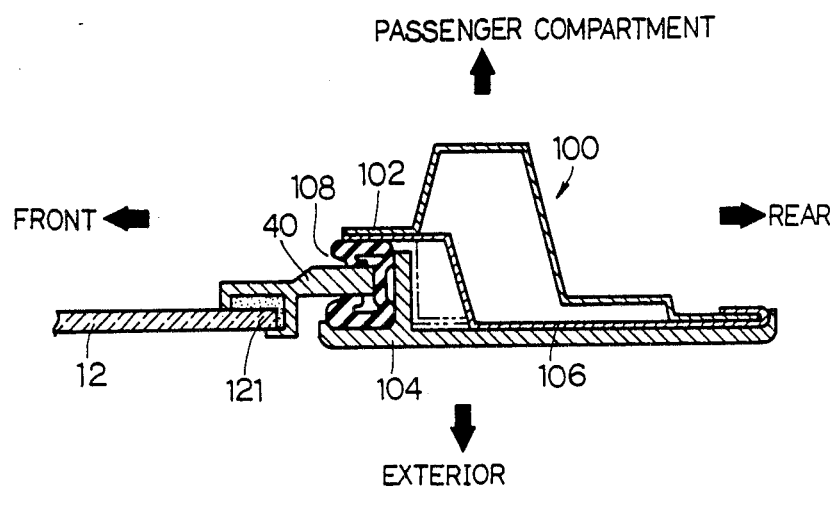
FIG. 8 is a cross-sectional view taken along the line VIII—VIII of FIG. 7.
Figure 9:
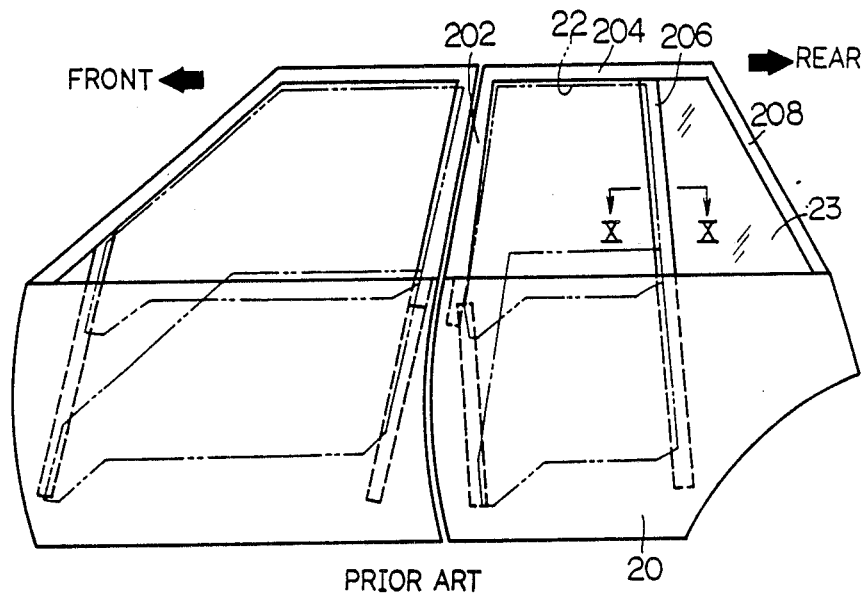
FIG. 9 is a side view of a vehicle door of another conventional vehicle.
Figure 10:
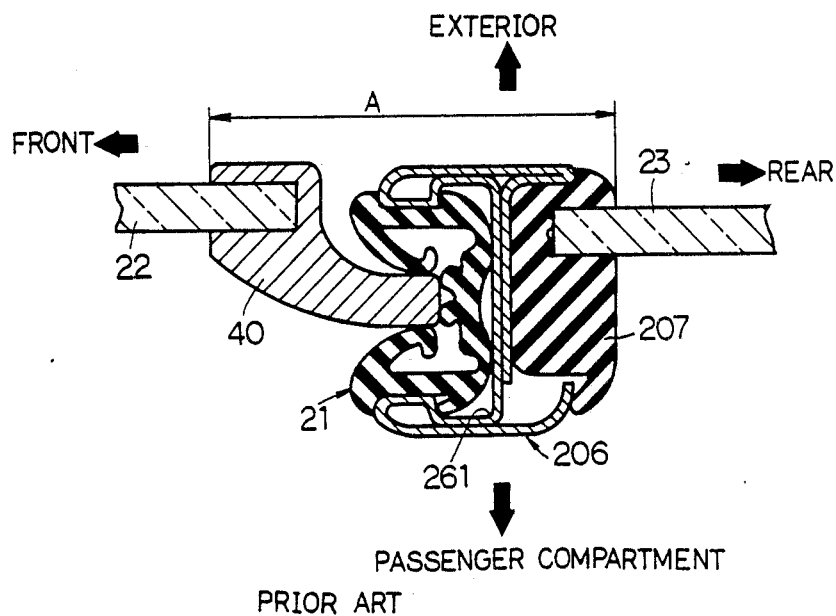
FIG. 10 is an enlarged cross-sectional view taken along the line X—X of FIG. 9.

FIG. 6 shows a third embodiment of a vehicle body structure. This third embodiment is substantially similar to the second embodiment shown in FIG. 5. An intermediate frame member 206 includes a forward groove 261, an outer surface 267 and a rear support 266. A cushion member 262 is mounted in the forward groove 261 and a slider 40 is guided by the cushion member 262. A first side 41 of the slider 40 is fixed to a rear edge 221 of a rear window glass 22.

A fixed window glass 23 is aligned with the rear window glass 22 in the longitudinal direction of a vehicle and is located at an exterior side of the intermediate frame member 206. The fixed window glass 23 is supported by the rear support 266 and the fixed window glass 23 is fixed to the outer surface 267 of the intermediate frame member 206 by a window molding 62. The window molding 62 includes a hook portion 621 which engages with an extention 268 of the outer surface 267 of the intermediate frame member 206. A sealing means 269 is located between the window molding 62 and the outer surface 267 of the intermediate frame member 206. The window molding 62 is secured to the fixed window glass 23 by an elastic adhesive. The window molding 62 has a decorative exterior end 634 and a front end 633 of the window molding 62 faces the first side 41 of the slider 40. The front surface 633 of the window molding 62 is positioned in the vicinity of the first side 41 of the slider 40 when the vehicle door is closed. The exterior end 411 of the slider 40 is substantially aligned with the exterior portion of the window molding 62. The exterior end 634 of the window molding 62 is smaller than an interior portion of the window molding 62.

Furthermore, the rear window glass 22 is fixed to the end 41 of the slider 40 and the fixed window glass 23 is fixed by the window molding 62. The exterior end 634 of the window molding 62 may be made small because the exterior end 634 only functions to fix the fixed window glass 23 to the intermediate frame members 206 through the hook portion 621 and the extention 268 of the intermediate frame members 206, and in similar manner the exterior portion 411 of the first side 41 of the slider 40 may be made small.

Accordingly, in the third embodiment, a longitudinal distance indicated by "A" in FIG. 6 becomes short, so that the exterior end 634 of the window molding 62 and the exterior portion 411 of the slider 40 do not detract from the aesthetic appearance of the exterior surface of the vehicle body and a substantially flush exterior surface of the vehicle is provided.

The fixed window glass 23 is secured to the intermediate frame members 206 by the decorative molding 62, so that the exterior surface of the vehicle also has an improved decorative aesthetic appearance.

While the present invention has been described in its preferred embodiments, it is to be understood that the invention is not limited thereto, and may be otherwise embodied within the scope of the following claims.

What is claimed is:

1. A vehicle body structure for a vehicle door, comprising:
    a frame member having a top end portion, a bottom portion and a first groove;
    a door body being connected to said bottom portion of said frame member, said frame member being located at an intermediate portion of said door body;
    a first window including a first portion, said first window being located at an outer said of said door body in a lateral direction of said vehicle door, within said vehicle body;
    a window regulator means mounted within said door body, said window regulator means functioning to upwardly and downwardly displace said first window;
    slider means including a first side and a second side, said first side of said slider means being secured to the first portion of said first window, said second side of said slider means being slidably mounted within said first groove of said frame member, said first side of said slider means being positioned outside of said second side of said slider means, such that said first window can be upwardly and downwardly displaced along said first groove of said frame member between an uppermost and lowermost position;
    fixing means including a second groove therein, said fixing means being positioned so that said second groove opens in a direction opposite to a direction of opening of said first groove of said frame member, said fixing means being located at an outerside of said frame member in the lateral direction of the door body, said fixing means being secured to said frame member; and
    a second window having a first portion, said first portion of said second window being secured to said fixing means, said second window being aligned with said first window in the longitudinal direction of the vehicle door.

2. The vehicle door structure of claim 1, further comprising guide means for guiding said second side of said slider means, said guide means being mounted in said first groove in said frame member.

3. The vehicle body structure of claim 2, wherein said guide means include a base portion and a bias portion, said bias portion being located at an inner side of the guide means in the lateral direction of said door body, whereby said bias portion functions to bias said second side of said slider means toward an outside of said door body.

4. The vehicle body structure of claim 1, wherein said first side of said slider means has an interior surface and an exterior surface, the exterior surface of said slider means being located on an exterior surface of said first window, the exterior surface of said slider means being smaller than said interior surface of said first end of said slider means.

5. The vehicle body structure of claim 4, wherein said fixing means has an exterior surface and an interior portion, the exterior surface of said fixing means being located on an exterior surface of said second window, the exterior surface of said fixing means being smaller than said interior portion of said fixing means.

6. The vehicle body structure of claim 5, wherein said exterior surface of said fixing means is substantially longitudinally aligned with said exterior surface of said first side of said slider means.

7. The vehicle body structure of claim 6, wherein said exterior surface of said fixing means is located in the vicinity of said first side of said slider means.

8. The vehicle body structure of claim 1, wherein said fixing means is integrally formed with said frame member, so that a cross-sectional shape of said frame member is of a substantially S shape.

9. A vehicle body structure of claim 1, further comprising a seal member located between said fixing means and said second window.

10. A vehicle body structure of claim 1, further comprising a spacer, said fixing means being secured to said spacer, said spacer being secured to said frame member.

11. The vehicle body structure of claim 1, wherein said fixing means has a hook portion and said frame member has an engagement member, said hook portion and said engagement member functioning to secure said fixing means to said frame member.

12. A vehicle body structure for a vehicle door, comprising:
    a front frame member including a first end portion and a second end portion;
    a top frame member including a front end portion, an intermediate portion and a rear end portion, said front end portion being connected with said first end portion of said front frame member;
    a rear frame member having a top end portion and a bottom end portion, said top end portion being connected with said rear end portion of said top frame;
    an intermediate frame member having a top end portion, a bottom end portion, an outer portion and an inner portion, said top end portion being connected with said intermediate portion of said top frame member, said inner portion of said intermediate frame member including a first groove having an opening;

a door body connected to said second end portion of said front frame member, said bottom end portion of said rear frame member and said bottom end portion of said intermediate frame member, thereby defining a first space between said top frame member, said front frame member, said intermediate frame member and said door body and a second space between said top frame member, said intermediate frame member, said rear frame member and said door body;

a first window having a top portion, a front portion and a rear portion, said first window being located at an outer side of said door body in lateral direction of said vehicle door within said door body;

a window regulator mounted within said door body for upwardly and downwardly displacing said first window;

slider means having a first side and a second side, said first side of said slider means being secured to the rear portion of said first window, said second side of said slider means being slidably mounted within said first groove of said intermediate frame member, said first side of said slider means being located to the outside of said second side of said slider means, such that said first window can be upwardly and downwardly displaced along said first groove of said intermediate frame member between an uppermost and lowermost position;

fixing means having a second groove therein, said second groove opening in a direction opposite to said opening of said first groove of said intermediate frame member, said fixing means being located at the outer portion of said intermediate frame member, said fixing means being secured to said intermediate frame member; and a second window having a front portion, said front portion being secured to said fixing means, said second window being aligned with said first window in the longitudinal direction of the vehicle door.

13. The vehicle body structure of claim 12, wherein said first side of said slider means includes an interior surface and an exterior surface, the exterior surface of said slider means being located on an exterior surface of said first window, the exterior surface of said slider means being smaller than said interior surface of said first side of said slider means.

14. The vehicle body structure of claim 13, wherein said fixing means includes an interior portion and an exterior surface, the exterior surface of said fixing means being located on an exterior surface of said second window, the exterior surface of said fixing means being smaller than said interior portion of said fixing means.

15. The vehicle body structure of claim 14, wherein said exterior surface of said fixing means is substantially aligned with said exterior surface of said first end of said slider means.

16. The vehicle body structure of claim 15, wherein said exterior surface of said fixing means is located in the vicinity of said first end of said slider means.

17. A vehicle body structure for a vehicle door, comprising:

a front frame member including a first end portion and a second end portion, the front frame member having a groove therein;

a top frame member including a front end portion, an intermediate portion and a rear end portion, said front end portion being connected with said first end portion of said front frame member, the top frame member having a groove therein;

a rear frame member having a top end portion and a bottom end portion, said top end portion being connected with said rear end portion of said top frame member, the rear frame member having a groove therein;

an intermediate frame member having a top end portion, a bottom end portion, an outer portion and an inner portion, said top end portion being connected to said intermediate portion of said top frame member, said intermediate frame member including a first groove having an opening;

a door body connected with said second end portion of said front frame member and said bottom end portions of said rear frame member and said bottom end portion of said intermediate frame member, thereby defining a first space between said top frame member, said front frame member, said intermediate frame member and said door body and a second space between said top frame member, said intermediate frame member, said rear frame member and said door body;

a first window having a top portion, a front portion and a rear portion, said first window being located at an outer side of said door body within said door body;

a window regulator means mounted within said door body for upwardly and downwardly displacing said first window;

slider means including a first side and a second side, said first side of said slider means being secured to the rear end portion of said first window, said second side of said slider means being slidably mounted within said first groove of said intermediate frame member, said first side of said slider means being located to the outside of said second side of said slider means, such that said first window can be upwardly and downwardly displaced along said first groove of said intermediate frame member between an uppermost and a lowermost position;

fixing means having a second groove therein, said fixing means being positioned so that said second groove opens in a direction opposite to said opening of said first groove of said intermediate frame member, said fixing means being located at the outer portion of said intermediate frame member, said fixing means being securd to said intermedite frame member; and a second window having a front portion, said front portion being secured to said fixing means, said second window being aligned with said first window in a longitudinal direction of a vehicle door.

18. The vehicle body structure of claim 17, wherein said first side of said slider means includes an interior surface and an exterior surface, the exterior surface of said first side of said slider means being located on an exterior surface of said first window, the exterior surface of said slider means being smaller than said interior surface of said first side of said slider means.

19. The vehicle body structure of claim 18, wherein said fixing means has an exterior surface and an interior portion, the exterior surface of said fixing means being located on an exterior surface of said second window, the exterior surface of said fixing means being smaller than said interior portion of said fixing means.

20. The vehicle body structure of claim 19, wherein said exterior surface of said fixing means is substantially aligned with said exterior surface of said first side of said slider means.

* * * * *